United States Patent
Gibbons et al.

(10) Patent No.: US 7,563,061 B2
(45) Date of Patent: Jul. 21, 2009

(54) SELF-CENTERING DRILL BIT CHUCK

(75) Inventors: Louis A. Gibbons, Stevensville, MD (US); David C. Campbell, Bel Air, MD (US)

(73) Assignee: Black & Decker Inc., Newark, DE (US)

( * ) Notice: Subject to any disclaimer, the term of this patent is extended or adjusted under 35 U.S.C. 154(b) by 211 days.

(21) Appl. No.: 11/355,244

(22) Filed: Feb. 15, 2006

(65) Prior Publication Data
US 2006/0192352 A1 Aug. 31, 2006

Related U.S. Application Data

(63) Continuation-in-part of application No. 11/055,362, filed on Feb. 9, 2005, now Pat. No. 7,243,923.

(60) Provisional application No. 60/654,854, filed on Feb. 18, 2005.

(51) Int. Cl.
*B23B 31/12* (2006.01)

(52) U.S. Cl. .................. 408/240; 279/60; 279/133; 279/137; 279/156

(58) Field of Classification Search .......... 279/133, 279/137, 139, 156, 123, 152, 60; 408/240
See application file for complete search history.

(56) References Cited

U.S. PATENT DOCUMENTS

| | | | | |
|---|---|---|---|---|
| 1,510,896 A | * | 10/1924 | McConnell | 279/62 |
| 1,697,447 A | * | 1/1929 | Albertson | 279/56 |
| 2,265,238 A | * | 12/1941 | Koehler | 279/49 |
| 2,315,524 A | * | 4/1943 | Hubbell | 279/62 |
| 2,387,339 A | * | 10/1945 | Meyer | 279/61 |
| 4,162,080 A | * | 7/1979 | Buck | 279/48 |
| 4,498,682 A | | 2/1985 | Glore | |
| 4,536,113 A | * | 8/1985 | Hatfield | 409/234 |
| 4,664,394 A | * | 5/1987 | Theissig et al. | 277/641 |
| 4,682,918 A | | 7/1987 | Palm | |
| 4,695,065 A | | 9/1987 | Komatsu et al. | |
| 4,840,387 A | | 6/1989 | McCarthy | |
| 4,951,955 A | | 8/1990 | Sakamaki | |
| 4,958,840 A | | 9/1990 | Palm | |
| 5,135,241 A | * | 8/1992 | Huff et al. | 279/142 |
| 5,215,317 A | * | 6/1993 | Jordan et al. | 279/63 |
| 5,299,814 A | | 4/1994 | Salpaka | |
| 5,409,243 A | | 4/1995 | Shadeck et al. | |

(Continued)

*Primary Examiner*—David P Bryant
*Assistant Examiner*—Eric A. Gates
(74) *Attorney, Agent, or Firm*—Harness, Dickey & Pierce, P.L.C.

(57) ABSTRACT

A chuck has a generally cylindrical body member having a nose section and a tail section. The tail section is configured to mate with the drive shaft so that the body rotates with the drive shaft. The nose section has an axial bore formed therein and a plurality of jaws is slidably positioned to engage a bit within the axial bore. Each of the jaws has a bit engaging jaw face formed thereon. One or more centering members are disposed adjacent to the jaws. The members are deformable from a first position where the members define a through passage configured to accept a bit, which has a drive shaft diameter less than a predefined diameter. The members are further configured to be deformable to a second position upon the insertion of a bit, which has a diameter greater than the predefined diameter, into the axial bore.

17 Claims, 8 Drawing Sheets

U.S. PATENT DOCUMENTS

| | | | |
|---|---|---|---|
| 5,411,275 A | 5/1995 | Huff et al. | |
| 5,431,420 A * | 7/1995 | Huff et al. | 279/62 |
| 5,465,983 A * | 11/1995 | Owens et al. | 279/157 |
| 5,531,461 A * | 7/1996 | Huff et al. | 279/62 |
| 5,573,254 A * | 11/1996 | Huff et al. | 279/62 |
| 5,918,886 A * | 7/1999 | Horiuchi et al. | 279/58 |
| 5,988,653 A | 11/1999 | Kuo | |
| 5,992,859 A | 11/1999 | Lin | |
| 6,196,554 B1 | 3/2001 | Gaddis et al. | |
| 6,241,026 B1 * | 6/2001 | Wache et al. | 173/132 |
| 6,247,706 B1 | 6/2001 | Kuo | |
| 6,257,596 B1 | 7/2001 | Yang | |
| 6,354,605 B1 | 3/2002 | Aultman | |
| 6,488,286 B2 | 12/2002 | Yaksich | |
| 6,517,295 B2 | 2/2003 | Lin | |
| 6,520,508 B1 | 2/2003 | Jordan | |
| 6,540,237 B1 | 4/2003 | Temple-Wilson | |
| 6,554,289 B1 | 4/2003 | Lin | |
| 6,729,812 B2 | 5/2004 | Yaksich et al. | |
| 6,883,808 B2 * | 4/2005 | Rohm et al. | 279/60 |
| 7,243,923 B2 * | 7/2007 | Campbell et al. | 279/133 |
| 2007/0152407 A1 * | 7/2007 | Mack | 279/60 |

* cited by examiner

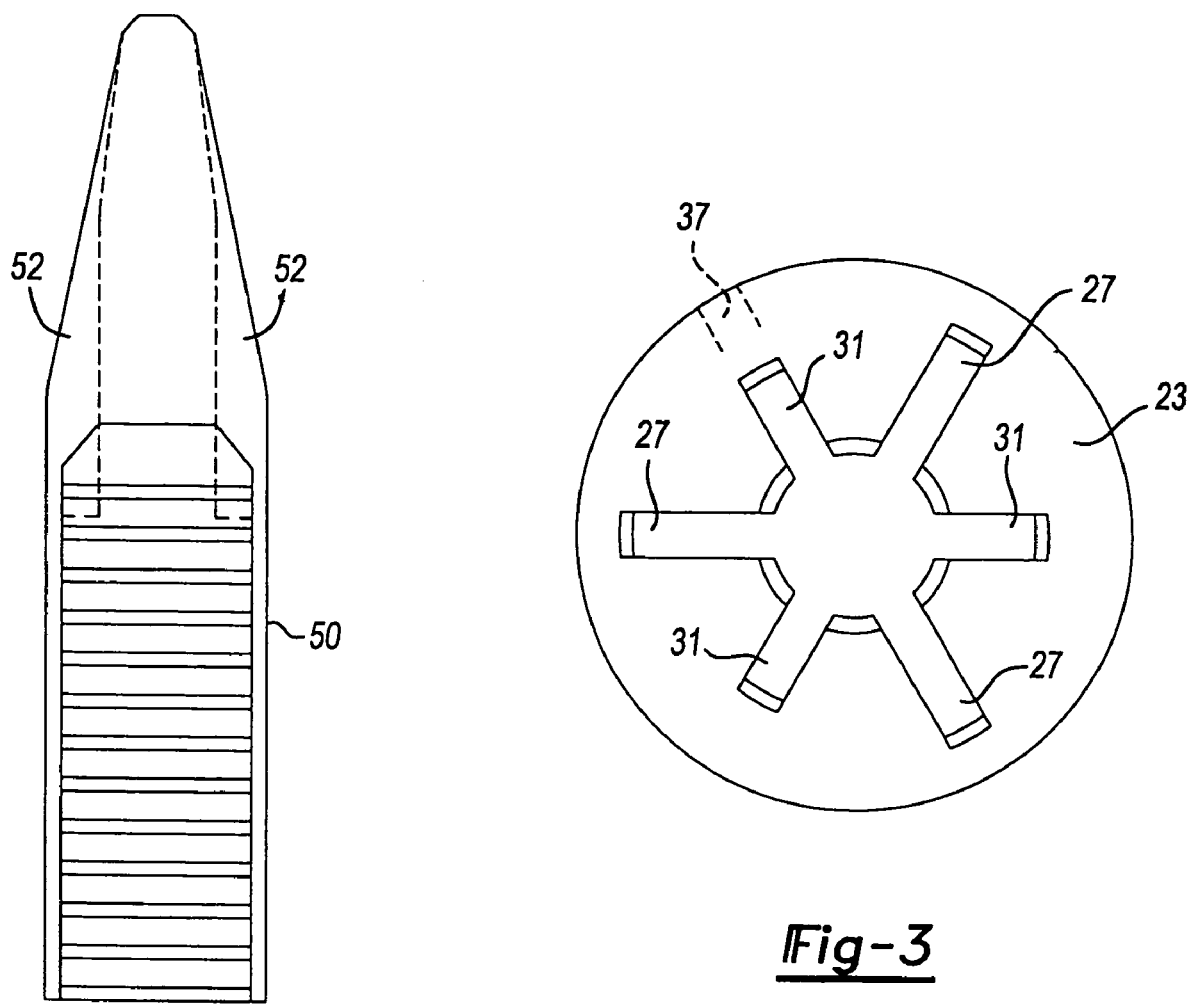
Fig-2
Fig-3
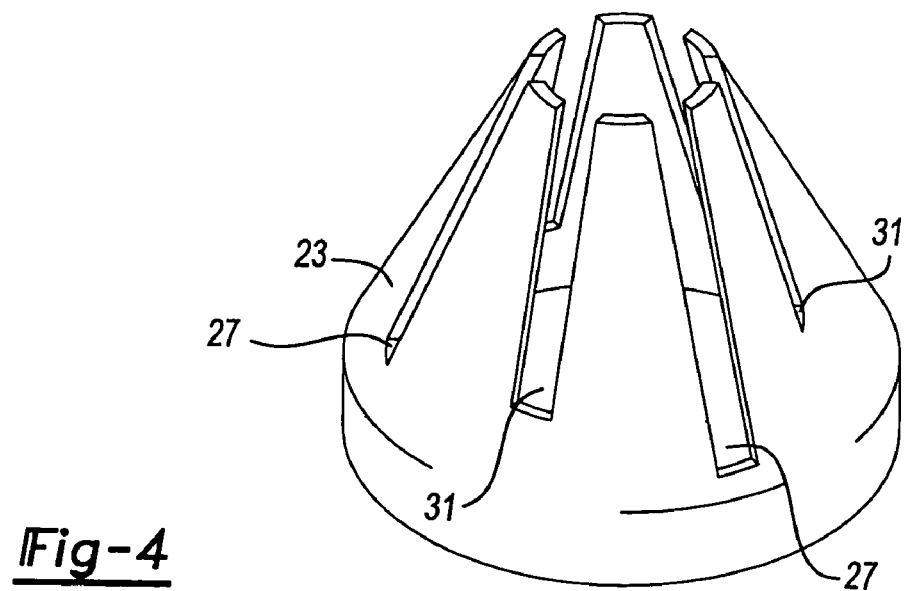
Fig-4

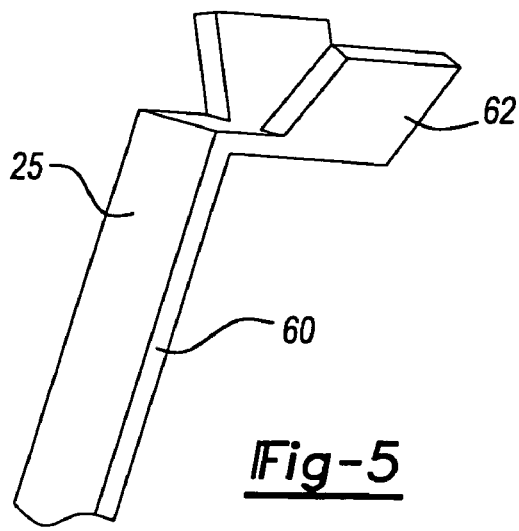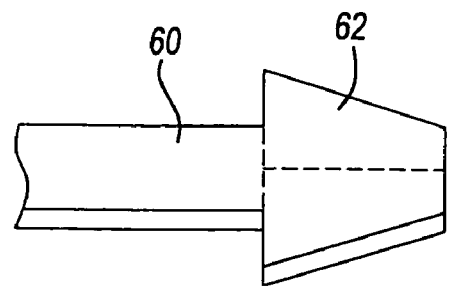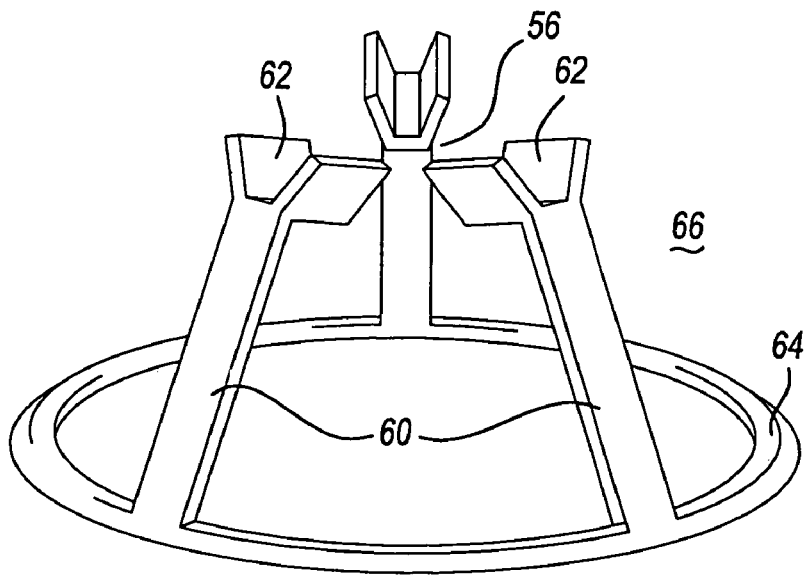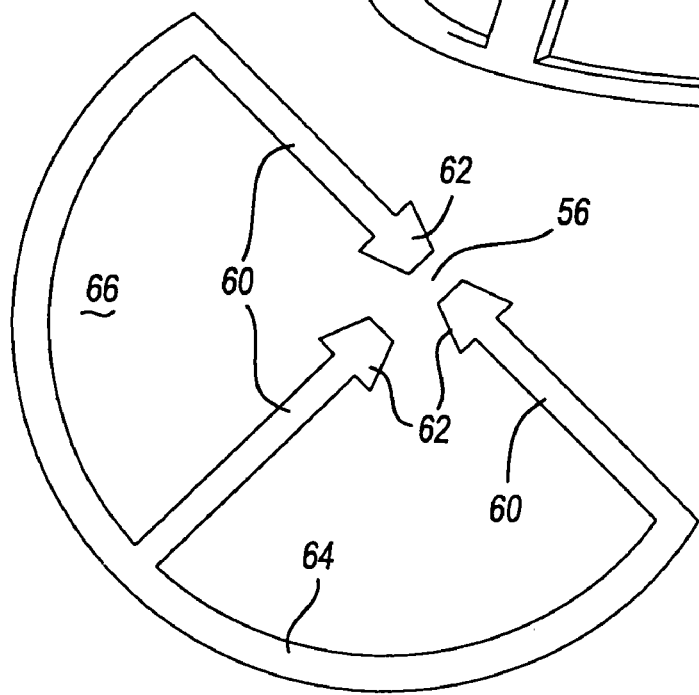
Fig-5
Fig-6
Fig-7
Fig-8

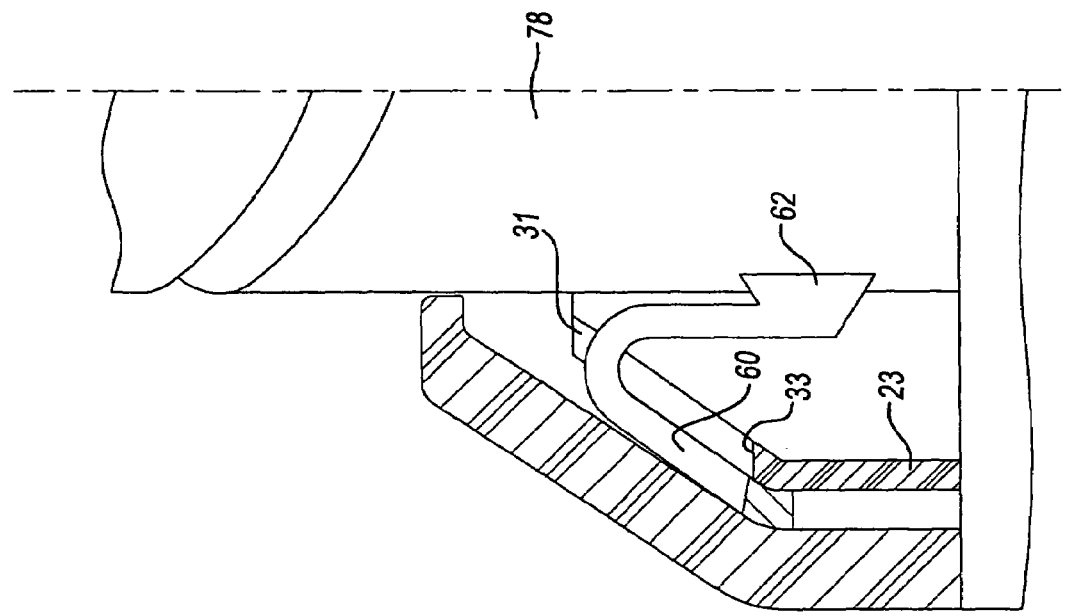
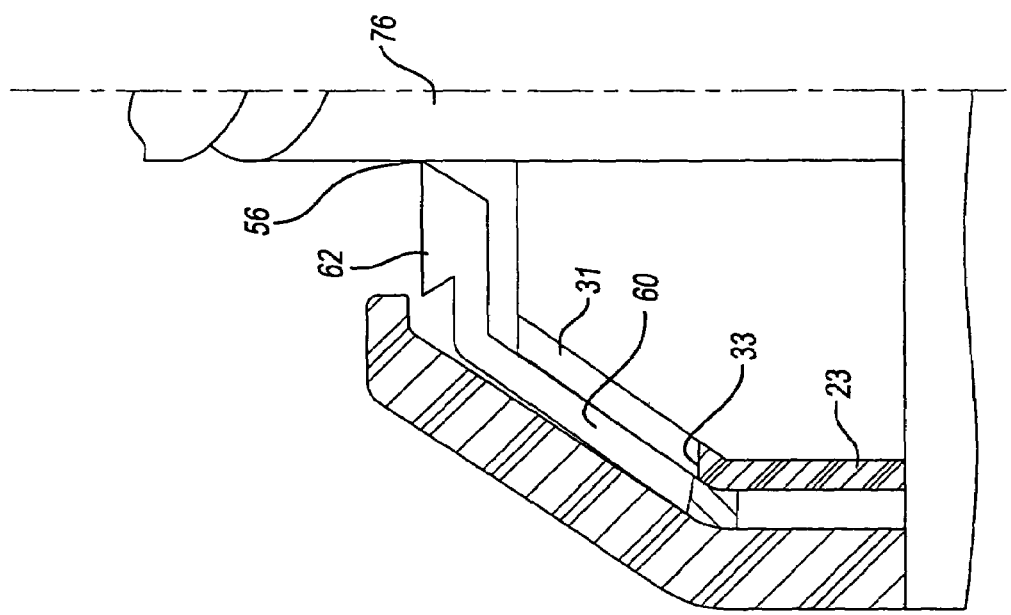

SELF-CENTERING DRILL BIT CHUCK

CROSS-REFERENCE TO RELATED APPLICATIONS

This application is a continuation-in-part of U.S. Ser. No. 11/055,362, filed Feb. 9, 2005 entitled "Centering Drill Chuck", and it also claims the benefit of U.S. Provisional Application No. 60/654,854, filed on Feb. 18, 2005 entitled "Self-Centering Drill Bit Chuck". The disclosures of the above applications are incorporated herein by reference.

FIELD OF THE INVENTION

The present invention relates to chucks and, more particularly, to self-centering chucks having mechanisms configured to engage a drill bit upon activation of a user engaged mechanism.

BACKGROUND OF THE INVENTION

Hand tool drivers are well-known. Although drills are the most common tools used with such drivers, the tools may also comprise screwdrivers, nut drivers, burrs, mounted grinding stones, and other cutting or abrading tools. Since the tools may have shanks of varying diameter or may have a polygonal cross-section, the device is usually provided with a chuck that is adjustable over a relatively wide range. The chuck may be attached to the driver by a threaded or tapered bore.

Numerous chucks have been developed in the art. Traditionally, chucks have three jaws spaced circumferentially approximately 120° apart from each other are constrained by angularly disposed passageways in a body attached to the driveshaft. The chuck is configured so that rotation of the body in one direction with respect to a constrained nut forces the jaws into or away from a gripping relationship with a tool shank. Such a chuck may be keyless if it can be tightened or loosened by manual rotation from a fully opened position to a position where the jaw elements contact each other.

Unfortunately, when the jaws are in their substantially fully retracted position, bits of less than a fixed diameter can be inserted improperly between the jaw elements. Under these conditions, when the jaws are tightened, the bit can be engaged so that it is not axially aligned with the drive mechanism. Traditionally, a user is, therefore, forced to hold the bit in one hand to manually center the bit within the axial bore.

SUMMARY OF THE INVENTION

To overcome the deficiencies of the prior art, a chuck for use with a manual or powered driver having a housing and a rotatable drive shaft extending therefrom is disclosed. The chuck includes a generally cylindrical body member having a nose section and a tail section. The tail section is configured to mate with the drive shaft so that the body rotates with the drive shaft. The nose section has an axial bore formed therein and a plurality of angularly disposed passageways formed therethrough and intersecting the axial bore. Each of a plurality of jaws is slidably positioned in one of the annularly disposed passageways. Each of the jaws has a jaw face formed on one side of a body and threads formed on the opposite side thereof. At least one deformable centering member is disposed adjacent to the jaws within the nose section. The centering member defines a through passage configured to accept a bit which has a drive shaft of less than a predefined diameter.

In another embodiment, a chuck is provided which includes a generally cylindrical body member having a nose section and a tail section. The tail section is configured to mate with the drive shaft so that the body rotates with the drive shaft. The nose section has an axial bore formed therein and a plurality of jaws is slidably positioned to engage a bit within the axial bore. Each of the jaws has a bit engaging jaw face formed thereon. A plurality of centering members is disposed adjacent to the jaws. The centering members are deformable away from a first position, where the members define a through passage configured to accept a tool bit with a drive shaft of less than a predefined diameter, to a second position. The centering members are further configured to be deformable to the second position upon the insertion of a bit having a diameter greater than the predefined diameter into the axial bore.

Further areas of applicability of the present teachings will become apparent from the detailed description provided hereinafter. It should be understood that the detailed description and specific examples, while indicating the preferred embodiments, are intended for purposes of illustration only and are not intended to limit the scope of the teachings.

BRIEF DESCRIPTION OF THE DRAWINGS

The present disclosure will become more fully understood from the detailed description and the accompanying drawings, wherein:

FIG. 2 represents a jaw element shown in the chuck of FIG. 1;

FIGS. 3 and 4 represent side and top views of a jaw guide similar to the guide shown in FIG. 1;

FIGS. 5 and 6 represent perspective side and top views of a centering member shown in FIG. 1;

FIGS. 7 and 8 represent perspective and top views of the centering member assembly shown in FIG. 1;

FIG. 9 represents a sectional view of the chuck of FIG. 1 with insertion of a small bit;

FIG. 10 represents a cross-sectional view of the chuck of FIG. 1 with a large bit inserted;

DETAILED DESCRIPTION OF THE PREFERRED EMBODIMENTS

The following description of the preferred embodiments is merely exemplary in nature and is in no way intended to limit the disclosure, its application, or uses.

Figure 1:
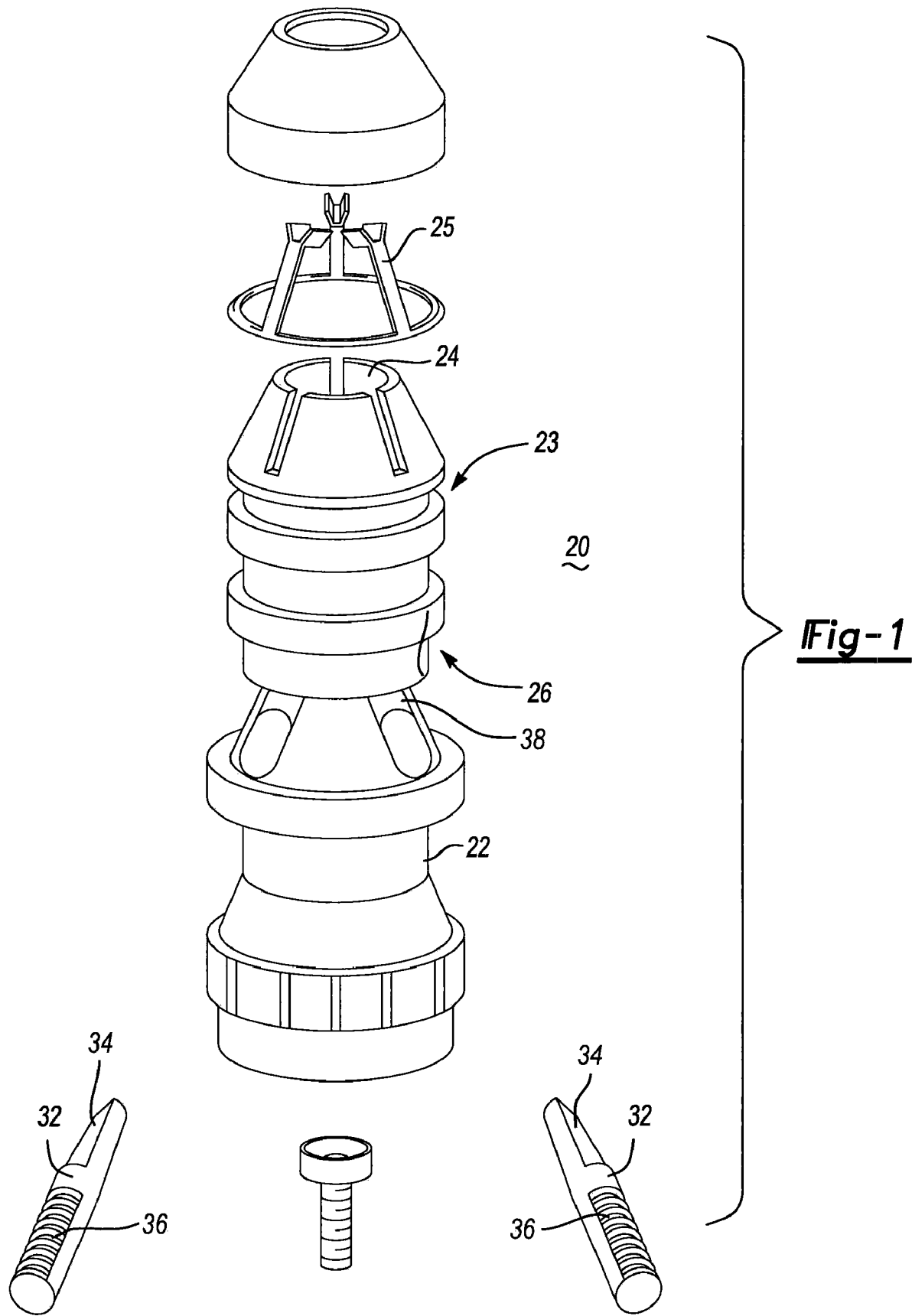
FIG. 1 is an exploded view of a chuck mechanism according to the teaching of the first embodiment to the present disclosure.

FIG. 1 represents an exploded view of a chuck mechanism 20 according to the teachings of first embodiment to the disclosure. The chuck 20 includes a cylindrical body 22 with a jaw guide 23 defining a bit accepting through bore 24, a jaw assembly 26, a drive socket assembly (not shown). Intersecting the through bore 24 is bit engaging jaw elements 32 of the jaw assembly 26. As further described below, the centering members 25 are configured to center a bit having a small diameter and to deform from the first position to a second position within the chuck 20 upon the insertion of a large diameter bit.

The jaw drive assembly can be manually driven with a key, or may be automatically driven as disclosed in co-assigned U.S. Provisional Patent Application No. 60/654,852 by Gehret, et al. entitled "Non-Slip Reverse Device for Impacting-Type Chuck", filed Feb. 18, 2005, incorporated herein by reference. These mechanisms cause the jaw elements 32 to move together when the jaw assembly 26 is rotated in a first direction and to disengage when the jaw assembly is rotated in a second direction relative to the fixed socket.

As seen in FIG. 2, the jaw elements 32 are defined by a generally cylindrical body 50, which have a bit engaging surface 34 and a threaded drive surface 36. The jaw elements 32 are slidably positioned through guideways 38 defined in the body 22 and are configured to intersect to engage the bit. Adjacent to the bit engaging surface is a pair of recessed cutouts 52. Adjacent cutouts 52 from separate jaw elements 32 form a centering member accepting space when the jaw elements 32 are brought together to engage the bit.

As seen in FIGS. 3 and 4, the jaw guide 23 is a conical member having a plurality of centering member slots 31 defined therein. The centering member slots 31 have a width 37 which correspond to the width of the beam or tail members 60 of the centering member 25 and a defined bearing surface 33 that provides a fixed surface for the beam members 60 to rotate about during the insertion of a large bit. Additionally formed in the jaw guide 23 is a plurality of jaw slots 27 which are configured to allow the passage and engagement of the jaw elements 32 with the bit. The centering members 25 are radially disposed about the plurality of centering member slots 31 defined in the jaw guide 23.

As seen in FIGS. 7 and 8, the centering member 25 defines a through passage 56 configured to accept a small bit 76 having a drive shaft with a diameter that is less than a predefined diameter. This through passage 56 is axially aligned with the axial passage of the chuck 20. As best seen in FIGS. 5 and 6, each centering member 25 is optionally formed of the beam or tail member 60 and a triangular head or end piece 62. The triangular end piece 62 is folded or bent with respect to the beam member 60. The end piece 62 is preferably bent at an angle of about 90° with respect the beam member 60. The end piece 62 is further folded along a transverse axis to form a generally "v" shaped surface. The first tips of three of the end pieces 62 are positioned adjacent to each other to form the through passage 56. As seen in FIGS. 7 and 8, the beam members 60 are optionally coupled to or integrally formed with a cylindrical or circular member 64 to form a centering assembly 66. The centering assembly 66 is optionally positioned over the plastic jaw guide 23 (see FIGS. 3 and 4).

FIG. 9 represents a cross-sectional view of the chuck 20 of FIG. 1 with the small bit 76 inserted. When the small bit 76 is entered into the through passage 56, the centering members 25 direct the small bit into the jaw path (away from the area between the sides of the jaws). As the jaw elements 32 (not shown) converge, the bit 76 is forced to the center of the jaw travel. As the jaw elements close on the bit 76, the centering members 25 are forced up into the space created by the cutouts 52 in the narrower jaw elements 32.

As shown in FIG. 10, larger bits 78 traditionally do not need centering because they do not get trapped improperly between the jaws. When the large bit 78 is inserted into the axial aperture, the centering members 25 are folded down into the body of the chuck into a relieved space between the jaws and a cover so they do not get damaged by the bit 78 or the jaw elements 32. In the second position, the centering members 25 are configured to deform to form a large bit accepting bore. In this regard, the centering members 25 are deformable into the chuck mechanism 20 and are deformable upon engagement of the bit's circular surface with the triangular end piece 62.

Figure 11:
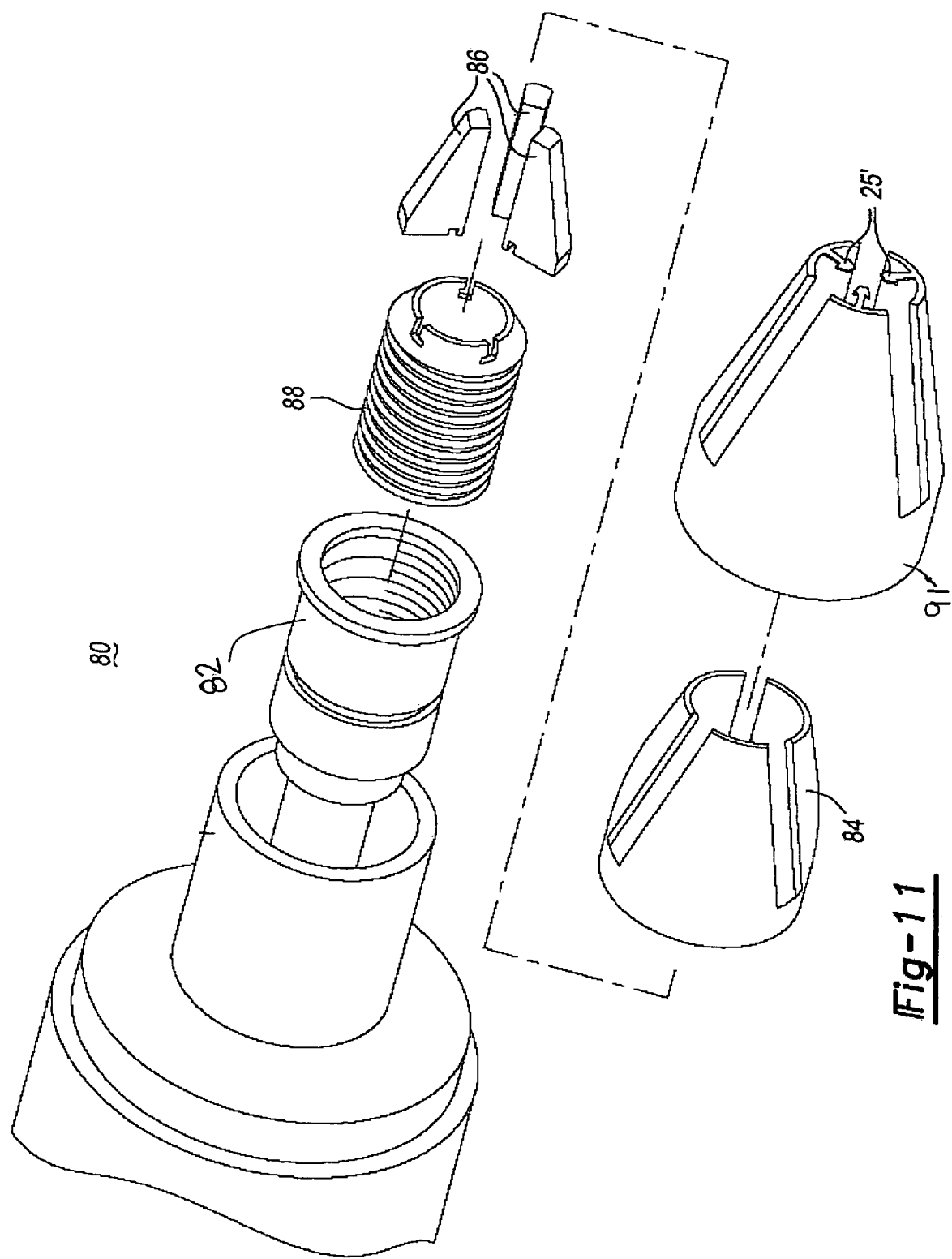
FIG. 11 represents an exploded view of a push chuck according to the teaching of the present disclosure.

FIG. 11 represents an exploded view of a push chuck 80 using centering members 25' according to the teaching of the present invention. The push chuck 80 has a chuck housing 82, a chuck retainer 84, a plurality of jaw elements 86, jaw adjuster 88, and a chuck shell 91. Push chucks 80 function by pushing the jaw elements 86 against a bearing surface on the jaw retainer 84 to move the jaw elements 86 together.

Figure 12A:
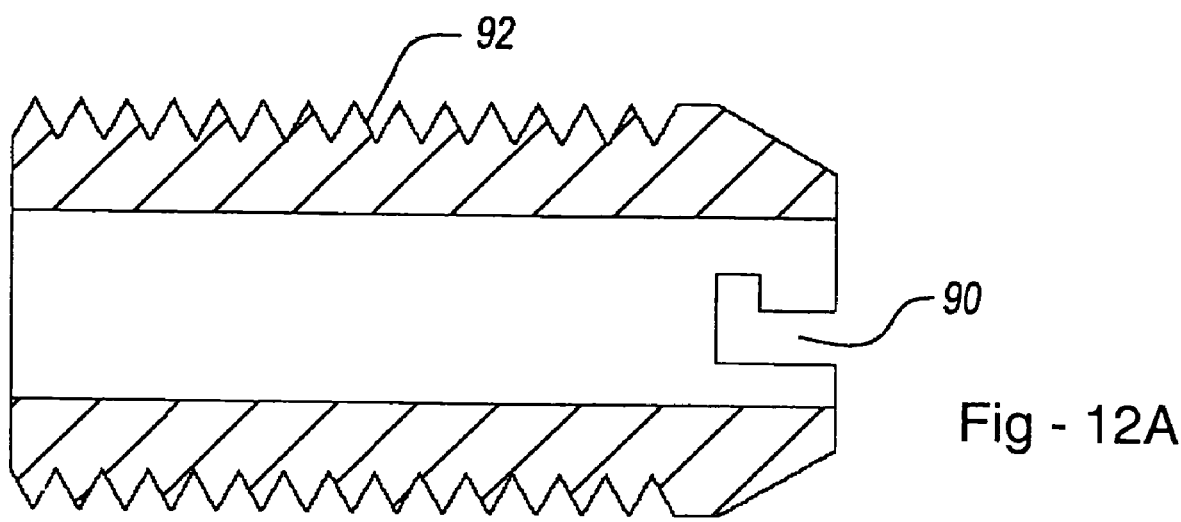
FIGS. 12a-12b represent jaw adjuster shown in FIG. 11.
Figure 12B:
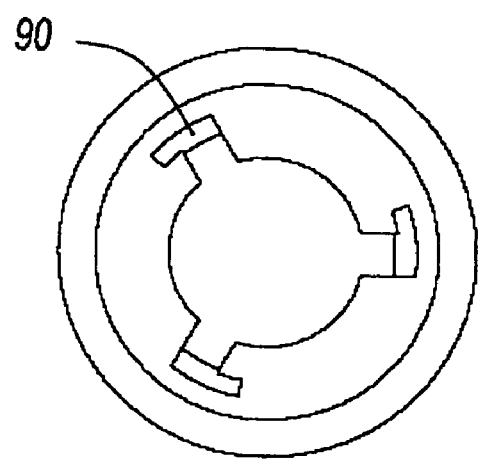
Figure 13:
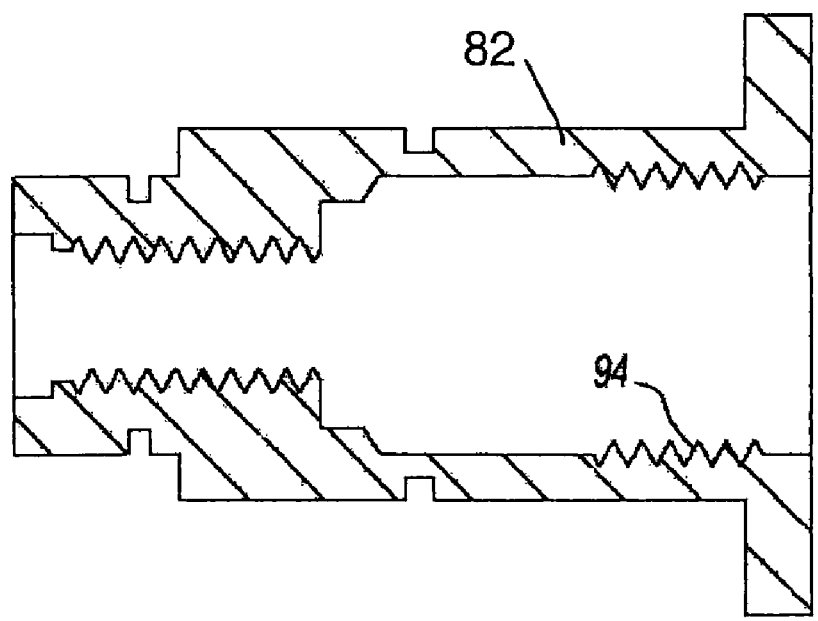
FIG. 13 is a chuck housing shown in FIG. 11.

FIGS. 12a-12b represents the jaw adjuster 88 shown in FIG. 11. The jaw adjuster 88 defines a J shaped slot 90 which engages a slotted flange (see FIG. 15) on the jaw element 86. The jaw adjuster 88 has a threaded outer surface 92 which intersects with an inner threaded surface 94 of the chuck housing 82 (see FIG. 14). The jaw elements 86 are rotatable coupled, yet axially fixed to the jaw adjuster 88. FIG. 13 represents a sectional view of the chuck housing 82 shown in FIG. 11. The chuck housing 82 is driven relative to the jaw adjuster 88 to drive the threaded surface 92 to force the jaws 86 together.

Figure 14:
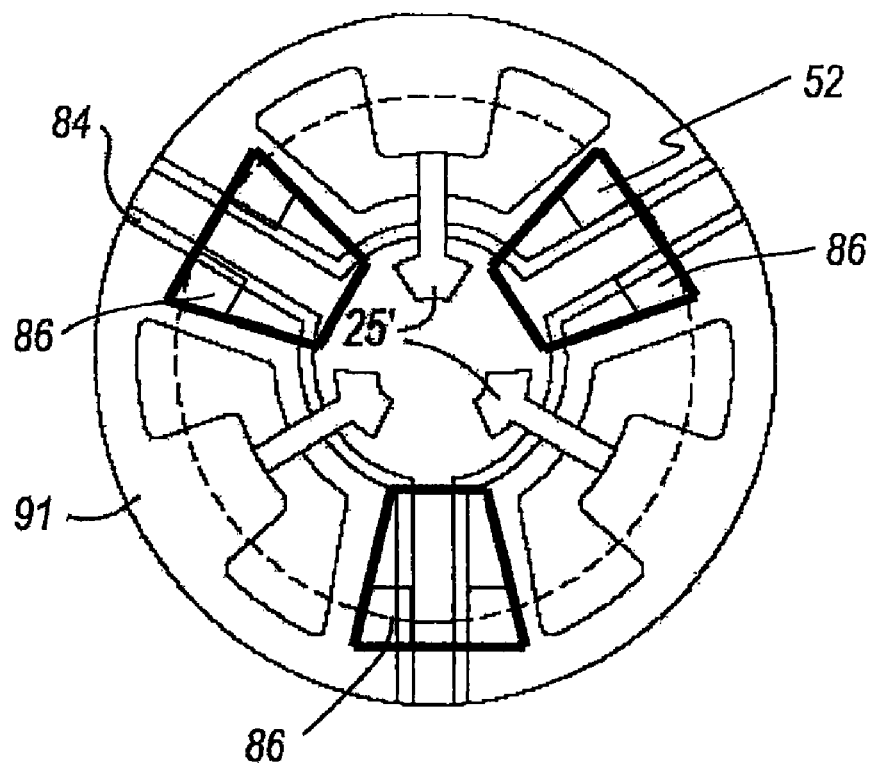
FIGS. 14 and 15 represents an end elevation and sectional views of the chuck shown in FIG. 11.
Figure 15:
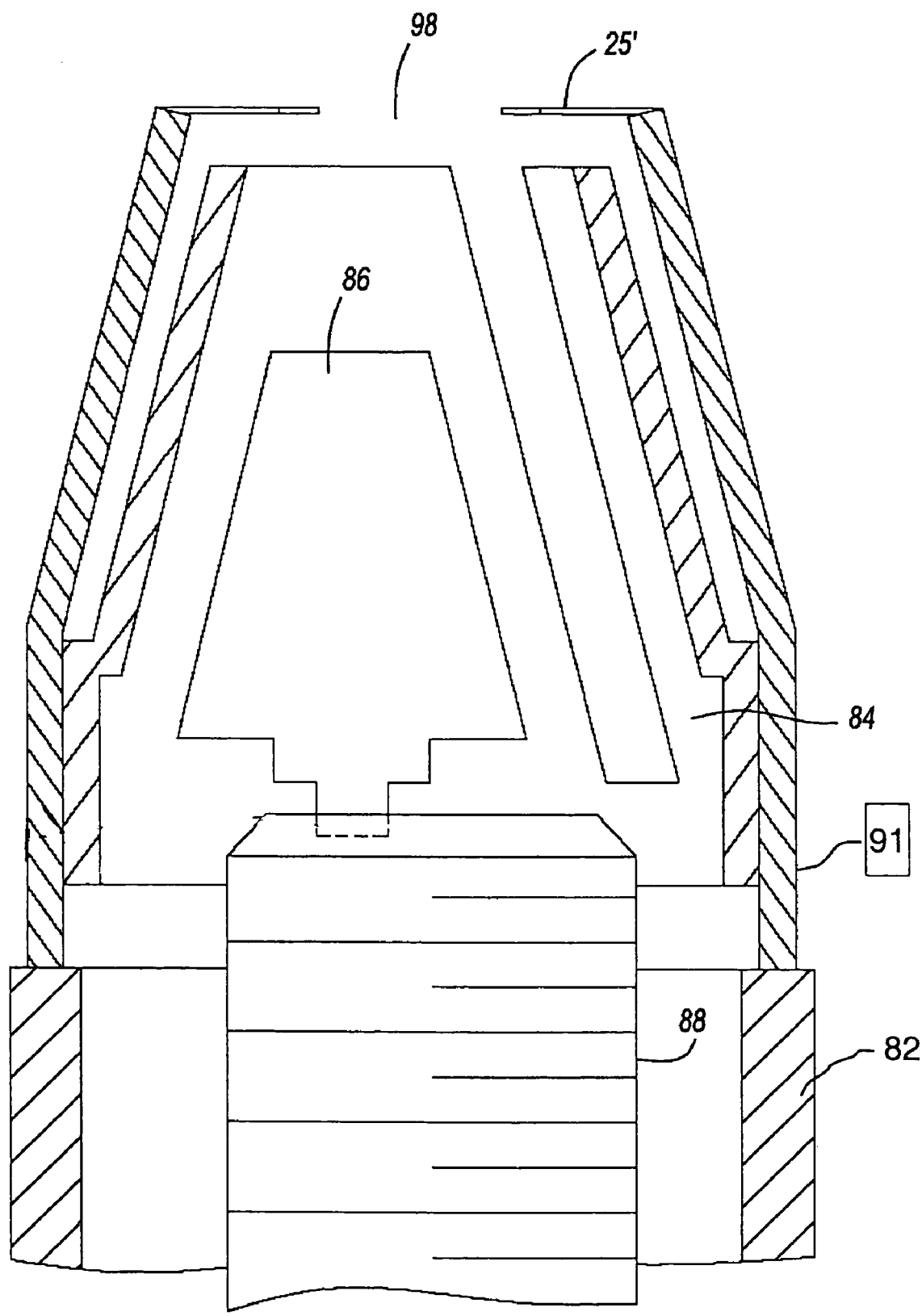

FIGS. 14 and 15 represent end and sectional views of the chuck shown in FIG. 11. Shown are the jaw elements 86 coupled to the jaw adjuster 88. Additionally shown is a plurality of centering members 25' being staked to an end portion of the chuck shell 91 or chuck retainer 84. As seen in FIG. 14, these centering members 25' are positioned between the bit engaging jaw elements 86. As described above, the centering members 25' form a small bit accepting through passage 98. The centering members 25' further deform into the chuck 80 into a space formed by notches 52 in the jaw elements 86 upon the insertion of a large diameter bit.

The centering members 25 and 25' are preferably formed of a material and in a configuration such that moving the members 25 and 25' from the first position to the second position occurs by elastically deforming the material. In this regard, the material is preferably a super-elastic material and most particularly a Nitinol material which formed of Nickel-titanium. Nickel-titanium alloys exhibiting super-elasticity are those containing approximately 50 wt. % Nickel and 50 wt. % Titanium. The phenomenon of super-elasticity observed in such alloys is manifested in the form of, large elastic deformation of the order of 8% that is completely reversible. However, unlike "normal" alloys like steels, stress is not proportional to strain on loading, and a characteristic plateau is obtained on the stress-strain curve. Large elastic strains are possible because of stress-induced super-elasticity whereby a phase-transformation occurs on loading that begins at the start of the plateau and ends when "normal" stress-strain behavior resumes at the end of the plateau. This makes this alloys extremely useful for the centering members 25 and 25' since on unloading only small changes in stress are observed for large changes in strain (the return distance moved by the centering member). It is envisioned that the centering members can be made of other highly elastic materials and can take other configurations which allow for entirely elastic deformation in the materials of the centering members 25 and 25' when a large bit is inserted into the axial bore.

The description of the disclosure is merely exemplary in nature and, thus, variations that do not depart from the gist of the invention are intended to be within the scope of the teachings. For example, it is envisioned that the centering members can be configured to accept a range of bit diameters. Further, it is envisioned that various super-elastic and elastic materials which allow large strains to occur prior to plastic deformation can be used to form centering paddles. Such variations are not to be regarded as a departure from the spirit and scope of the teachings.

What is claimed is:

1. A chuck assembly comprising:
a cylindrical body defining a bore;
a jaw assembly associated with said cylindrical body and having one or more jaw elements, the one or more jaw elements movable in said bore between a non-clamping and clamping position;
a drive mechanism coupled with said jaw assembly for moving the one or more jaw elements between said non-clamping and clamping positions; and
a centering mechanism for centering a tool in said jaw assembly in said non-clamping position, said centering mechanism including at least one tool engaging centering member extending radially inward into said bore, said tool engaging member including a head portion cantilevered from a tail portion, said head portion continuous with said tail portion and said head portion angled with respect to said tail portion, said head portion adapted to engage the tool and said head portion positioned in said bore of said cylindrical body, said head portion movable in said bore between adjacent jaw elements.

2. The chuck assembly according to claim 1, said head portion further having an overall V-shape.

3. The chuck assembly according to claim 1, wherein said head portion is angled at about 90° with respect to said tail portion.

4. The chuck assembly according to claim 1, wherein said tail portion is connected to a base.

5. The chuck assembly according to claim 4, wherein said base includes a circular portion.

6. The chuck assembly according to claim 4, wherein said tail is angled with respect to said base.

7. The chuck assembly according to claim 1, wherein adjacent cutouts from said one or more jaw elements form a centering member accepting space.

8. The chuck assembly according to claim 1, wherein said centering mechanism includes a plurality of tool engaging members.

9. The chuck assembly of claim 1, wherein a space exists between adjacent jaw elements for receiving said centering member of said centering mechanism.

10. A drill in combination with a chuck comprising:
a cylindrical body defining a bore;
a drill and a chuck coupled with said drill;
said chuck comprising:
a jaw assembly associated with said cylindrical body and having one or more jaw elements, the one or more jaw elements movable in said bore between a non-clamping and clamping position;
a drive mechanism coupled with said jaw assembly for moving the one or more jaw elements between said non-clamping and clamping positions; and
a centering mechanism for centering a tool in said jaw assembly in said non-clamping position, said centering mechanism including at least one tool engaging centering member extending radially inward into said bore, said tool engaging member including a head portion cantilevered from a tail portion, said head portion continuous with said tail portion and said head portion angled with respect to said tail portion, said head portion adapted to engage the tool and said head portion positioned in said bore of said cylindrical body, said head portion movable in said bore between adjacent jaw elements.

11. The combination according to claim 10, said head portion further having an overall V-shape.

12. The combination according to claim 10, wherein said head portion is angled at about 90° with respect to said tail portion.

13. The combination according to claim 10, wherein said tail portion is connected to a base.

14. The combination according to claim 13, wherein said base includes a circular portion.

15. The combination according to claim 13, wherein said tail is angled with respect to said base.

16. The combination according to claim 10, wherein adjacent cutouts from said one or more jaw elements form a centering member accepting space.

17. The combination according to claim 10, wherein said centering mechanism includes a plurality of tool engaging members.

* * * * *

UNITED STATES PATENT AND TRADEMARK OFFICE
CERTIFICATE OF CORRECTION

| | |
|---|---|
| PATENT NO. | : 7,563,061 B2 |
| APPLICATION NO. | : 11/355244 |
| DATED | : July 21, 2009 |
| INVENTOR(S) | : Louis A. Gibbons et al. |

Page 1 of 1

It is certified that error appears in the above-identified patent and that said Letters Patent is hereby corrected as shown below:

<u>Column 5</u>
Line 35, "cutouts" should be -- cutoffs --.

<u>Column 6</u>
Line 36, "cutouts" should be -- cutoffs --.

Signed and Sealed this

Thirteenth Day of October, 2009

David J. Kappos
*Director of the United States Patent and Trademark Office*